(12) United States Patent
Adams et al.

(10) Patent No.: US 7,105,109 B2
(45) Date of Patent: *Sep. 12, 2006

(54) LATENT MERCAPTANS AS STABILIZERS FOR HALOGEN-CONTAINING POLYMER COMPOSITIONS

(75) Inventors: Paul Brian Adams, Hamilton, OH (US); Gene K. Norris, West Chester, OH (US); Tod C. Duvall, West Chester, OH (US)

(73) Assignee: Rohm and Haas Company, Philadelphia, PA (US)

( * ) Notice: Subject to any disclaimer, the term of this patent is extended or adjusted under 35 U.S.C. 154(b) by 318 days.

This patent is subject to a terminal disclaimer.

(21) Appl. No.: 10/648,755

(22) Filed: Aug. 26, 2003

(65) Prior Publication Data

US 2004/0143044 A1 Jul. 22, 2004

Related U.S. Application Data

(63) Continuation-in-part of application No. 09/008,542, filed on Jan. 16, 1998, now Pat. No. 6,743,840, which is a continuation-in-part of application No. 08/597,093, filed on Feb. 23, 1996, now abandoned, which is a continuation-in-part of application No. 08/435,413, filed on May 10, 1995, now abandoned.

(51) Int. Cl.
*C09K 15/32* (2006.01)

(52) U.S. Cl. ............................... 252/400.1; 252/400.62; 252/400.54; 252/402; 252/406; 524/110; 524/392; 524/330; 524/331

(58) Field of Classification Search ............. 252/400.1, 252/400.62, 400.54, 402, 406; 524/110, 524/392, 330, 331
See application file for complete search history.

(56) References Cited

U.S. PATENT DOCUMENTS

| | | | |
|---|---|---|---|
| 3,660,331 A | 5/1972 | Ludwig | |
| 4,507,417 A | 3/1985 | Ishii et al. | |
| 4,519,430 A | 5/1985 | Ahmad et al. | |
| 4,772,405 A | 9/1988 | Wirth | |
| 4,973,619 A | 11/1990 | Kemper | |
| 5,109,046 A | 4/1992 | Larkin et al. | |
| 5,166,241 A | 11/1992 | Kornbaum | |
| 5,288,776 A | 2/1994 | Drewes et al. | |
| 5,639,903 A | 6/1997 | Takahashi et al. | |
| 6,232,380 B1 | 5/2001 | Conroy et al. | |

FOREIGN PATENT DOCUMENTS

| | | |
|---|---|---|
| EP | 0 214932 | 3/1987 |
| EP | 0 890608 | 1/1999 |
| EP | 0 945484 | 9/1999 |
| EP | 1 004624 | 5/2000 |
| EP | 0 742 259 | 10/2000 |
| EP | 1 055 704 | 11/2000 |
| EP | 1 201 706 | 5/2002 |
| EP | 0 945 485 | 10/2003 |
| GB | 1042639 | 9/1966 |
| WO | WO 00/25071 | 10/1999 |

*Primary Examiner*—Peter D. Mulcahy
(74) *Attorney, Agent, or Firm*—Carl P. Hemenway

(57) ABSTRACT

Compositions useful as heat stabilizers comprising at least one latent mercaptan-containing compound and at least one zinc compound are provided. Halogen-containing polymer compositions comprising such heat stabilizers are also provided.

11 Claims, No Drawings

LATENT MERCAPTANS AS STABILIZERS FOR HALOGEN-CONTAINING POLYMER COMPOSITIONS

This is application is a continuation-in-part of application Ser. No. 09/008,542, filed Jan. 16, 1998, U.S. Pat. No. 6,743,840 which is a continuation-in-part of application Ser. No. 08/597,093, filed Feb. 23, 1996, now abandoned, which was a continuation-in-part of application Ser. No. 08/435,413 filed May 10, 1995, now abandoned.

FIELD OF THE INVENTION

This invention relates to stabilizer compositions comprising degradation products of a blocked mercaptan present during processing of the composition at an elevated temperature, said products including a free mercaptan. This invention also relates to polymer compositions containing a polymer normally susceptible to heat-induced deterioration and the degradation products of a blocked mercaptan present during processing of the composition at an elevated temperature, said products including a free mercaptan. It also relates to such polymer compositions further containing a metallic-based heat stabilizer. This invention also relates to articles of manufacture, e.g. pipe, film, and window profile, made from stabilized polymer compositions containing a polymer normally susceptible to heat-induced deterioration, the degradation products of a blocked mercaptan present during processing of the composition at an elevated temperature, and a metallic-based heat stabilizer. Another aspect of this invention is the development of a novel reaction scheme which affords latent mercaptans which need no purification to be highly active PVC heat stabilizers at low use levels.

This invention also relates to latent mercaptans which are substantially free of the offensive odor typical of mercaptans and which may be used as anti-oxidants, odorants, anti-microbial agents, chelating agents and photostabilizers; and as intermediates for the preparation of anti-oxidants and primary heat stabilizers. It also relates to such anti-oxidants and primary heat stabilizers.

BACKGROUND OF THE INVENTION

It is well known that the physical properties of various organic polymers deteriorate and color changes take place during processing of the polymer and during exposure of formed polymer products to certain environments. The prime examples of polymers which are susceptible to degradation during processing are the halogen-containing polymers such as the vinyl and vinylidene polymers in which the halogen is attached directly to carbon atoms. Poly (vinyl chloride) or PVC, copolymers of vinyl chloride and vinyl acetate, and poly (vinylidene chloride), the principal resin in self-clinging transparent food wraps, are the most familiar polymers which require stabilization for their survival during fabrication into pipes, window casings, siding, bottles, and packaging film, etc. When such polymers are processed at elevated temperatures, undesirable color changes often occur within the first 5 to 10 minutes as well as during later stages of the processing. Haziness, which sometimes accompanies the color changes, is particularly undesirable where clear products are needed. The addition of heat stabilizers to such polymers has been absolutely essential to the widespread utility of the polymers. From a great deal of work in the development of more and more effective heat stabilizers there has emerged two principal classes: organotin compounds and mixed metal combinations. Organotin-based heat stabilizers are the most efficient and widely used PVC stabilizers. Synergistic combinations of alkyltin mercaptides and free mercaptans are particularly efficient heat stabilizers for PVC during extrusion. They have not been entirely satisfactory, however, because of several failings on the part of the mercaptan synergist. Many mercaptans give off an offensive odor even at room temperature and the odor grows worse at PVC processing temperatures. The oxidative stability of the mercaptans is very often very poor. Oxidation of the free mercaptans diminishes the synergism. Thus, a combination having an enhanced synergism would be welcomed by the PVC industry. Also, because of the end-use of articles made from some polymers, many polymeric compositions require the presence of both biocides and heat stabilizers but the use of the organotin mercaptide/mercaptan combination in such a composition is often frustrated by the tendency of the free mercaptan to deactivate a biocide such as the much used OBPA (10,10'-oxybisphenoxarsine).

In U.S. Pat. No. 3,660,331, Ludwig teaches the stabilization of vinyl halide resins by certain thioethers and thioesters of tetrahydropyran. Better heat stabilizer compositions are still needed, however. The thioethers of this invention satisfy that need.

SUMMARY OF THE INVENTION

It is an object of this invention, therefore, to provide a heat stabilizer composition having the synergy of a mercaptan plus improved oxidative stability.

It is another object of this invention to provide a latent mercaptan containing heat stabilizer composition which is substantially free from the offensive odor typically associated with mercaptans.

It is a related object of this invention to provide a latent mercaptan-containing heat stabilizer composition which has a decidedly pleasant odor.

It is a related object of this invention to provide a polymeric composition containing a heat stabilizer combination having the synergy of a mercaptan plus improved oxidative stability.

It is still another object of this invention to provide latent mercaptans as intermediates for the preparation of antioxidants, anti-microbial agents, photostabilizers, and primary heat stabilizers.

These and other objects of the invention which will become apparent from the following description are achieved by incorporating into a polymeric composition containing a polymer normally susceptible to heat-induced deterioration a blocked mercaptan which degrades during processing of the composition at an elevated temperature to liberate a free mercaptan. The latent mercaptan may act as the sole heat stabilizer but the free mercaptan may also synergize the activity of other heat stabilizers in the composition.

As used herein, the terms "blocked mercaptan" and "latent mercaptan" are used interchangeably to mean a thioether which degrades during processing of the composition at an elevated temperature to liberate a free mercaptan. Other products of the degradation of the blocked mercaptan are believed to include carbocations of the blocking moiety which are stabilized by a molecular structure in which the electron deficiency is shared by several groups. Resonance stabilization and neighboring group stabilization are two of the possible mechanisms by which the carbocations may be stabilized. The carbocations act as intermediates in the formation of stable compounds early in the hot processing of halogen-containing polymers. Although such mechanisms and the resultant carbocations are believed to be an impetus for the liberation of the active free mercaptan, this invention is in no way limited by the foregoing attempt to explain the working of the invention. Those skilled in the art will see the resonance stabilization and neighboring group stabilization that are possible in the following structures of the blocked mercaptan; other mechanisms may be at work in other blocked mercaptans represented by these structures that also liberate an active free mercaptan upon thermal and/or chemical degradation during processing of polymeric compositions containing such blocked mercaptans.

The stabilizer compositions of the present invention may comprise a metal-based stabilizer and such a latent mercaptan or mixture of latent mercaptans.

In one aspect of the present invention, there is provided a polymeric composition comprising (a) a polymer component susceptible to heat-induced deterioration,
(b) degradation products of a blocked mercaptan present in an amount of from about 1 to about 3.5 parts per hundred parts of said polymer component during processing of said polymeric composition at an elevated temperature, wherein said degradation products comprise a free mercaptan, and wherein said blocked mercaptan has the structure:

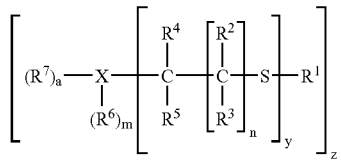

Formula 1 wherein:
a is 0 or 1, m and n are 0 or 1; y=1 to 4; when y=1, z is 1 to 4; when y is more than 1, z is 1;
$R^1$ is an alkoxycarbonylalkyl, alkoxycarbonylalkylenyl, hydroxyalkoxycarbonylalkyl, hydroxy(polyalkoxy)carbonylalkyl, alkoxy(polyalkoxy)carbonylalkyl, mercaptoalkoxycarbonylalkyl, mercaptoalkoxycarbonylalkylenyl, tetrahydropyranyloxycarbonylalkyl, tetrahydropyranyloxy(polyalkoxy)carbonylalkyl, or alkylcarbonyloxy(polyalkoxy)carbonylalkyl radical having from 1 to 22 carbon atoms;
$R^2$, $R^3$, $R^4$, $R^5$, $R^6$, and $R^7$, are independently hydrogen, a hydroxyl, mercapto, acyl, alkyl, alkylenyl, aryl, haloaryl, alkaryl, aralkyl, hydroxyalkyl, mercaptoalkyl, hydroxyaryl, alkoxyaryl, alkoxyhydroxyaryl, mercaptoalkylenyl, mercaptoalkoxycarbonylalkylenyl, hydroxyaryl, arylcarbonyl, mercaptoaryl, carboxyalkyl, or carboxyaryl radical having from 1 to 22 carbon atoms; and
X is aryl, haloaryl, alkaryl, hydroxyaryl, dihydroxyaryl, aralkyl, alkoxyaryl, arylcycloalkyl, or a heteroatom;
with the option that, when a is 1 and m is 0, one of the $R^3$ and $R^5$ radicals joins with $R^7$ and X to form a heterocyclic moiety with X as a heteroatom selected from the group consisting of oxygen and sulfur;
with the further option that, when m is 1, $R^6$ and $R^7$ form a heterocyclic moiety in conjunction with X as a nitrogen atom;
with the proviso that, when $R^6$ is not a hydroxyl or mercapto, z is 1; and (c) at least one zinc compound, wherein when both zinc chloride and zinc carboxylate are present, the ratio of zinc contributed by zinc carboxylate to zinc contributed by zinc chloride either is between 0:100 and 10:90 or is between 80:20 and 100:0.

In a second aspect of the present invention, there is provided a composition for stabilizing PVC comprising (a) a zinc compound, wherein when both zinc chloride and zinc carboxylate are present, the ratio of zinc contributed by zinc carboxylate to zinc contributed by zinc chloride either is between 0:100 and 10:90 or is between 80:20 and 100:0, and
(b) a latent mercaptan having the formula

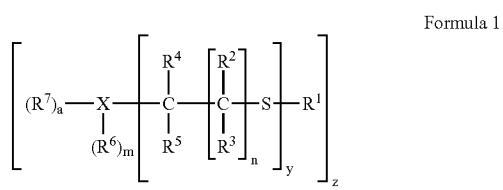

Formula 1 wherein
a is O or 1, m and n are O or 1; y=1 to 4; when y=1, z is 1 to 4; and when y is more than 1, z is 1;
$R^1$ is an alkoxycarbonylalkyl, alkoxycarbonylalkylenyl, hydroxyalkoxycarbonylalkyl, hydroxy(polyalkoxy)carbonylalkyl, alkoxy(polyalkoxy)carbonylalkyl, mercaptoalkoxycarbonylalkyl, mercaptoalkoxycarbonylalkylenyl, tetrahydropyranyloxycarbonylalkyl, tetrahydropyranyloxy(polyalkoxy)carbonylalkyl, or alkylcarbonyloxy(polyalkoxy)carbonylalkyl radical having from 1 to 22 carbon atoms;
$R^2$, $R^3$, $R^4$, $R^5$, $R^6$, $R^7$, are independently hydrogen, a hydroxyl, mercapto, acyl, alkyl, alkylenyl, aryl, haloaryl, alkaryl, aralkyl, hydroxyalkyl, mercaptoalkyl, hydroxyaryl, alkoxyaryl, alkoxyhydroxyaryl, mercaptoalkylenyl, mercaptoalkoxycarbonylalkylenyl, hydroxyaryl, arylcarbonyl, mercaptoaryl, carboxyalkyl, or carboxyaryl radical having from 1 to 22 carbon atoms; and
X is aryl, haloaryl, alkaryl, hydroxyaryl, dihydroxyaryl, aralkyl, alkoxyaryl, arylcycloalkyl, or a heteroatom;
with the option that, when a is 1 and m is 0, one of the $R^3$ and $R^5$ radicals joins with $R^7$ and X to form a heterocyclic moiety with X as a heteroatom selected from the group consisting of: oxygen and sulfur;
with the further option that, when m is 1, $R^6$ and $R^7$ form a heterocyclic moiety in conjunction with X as a nitrogen atom;
with the proviso that, when $R^6$ is not a hydroxyl or mercapto, z is 1.

DETAILED DESCRIPTION OF THE INVENTION

As used herein: the terms "group" and "radical" are used interchangeably, a monovalent radical has but one valence available for combining with another radical whereas a divalent radical has two valences and thus may combine with two other radicals; the term alkyl represents monovalent straight or branched chain hydrocarbon radicals containing, for example, 1 to 20 carbon atoms; the term alkylenyl represents divalent, trivalent, and tetravalent straight or branched chain hydrocarbon radicals containing, for example, 1 to 20 carbon atoms; the term aryl represents monovalent $C_6$–$C_{10}$ aromatic rings such as benzene and naphthalene; the term alkenyl represents monovalent straight or branched chain $C_2$ to $C_{20}$ hydrocarbon radicals containing at least one double bond; the term aralkyl represents a monovalent $C_1$ to $C_{20}$ hydrocarbon radical having attached thereto an aryl radical; the term alkaryl represents monovalent aryl radicals having attached thereto at least one $C_1$–$C_{20}$ alkyl group; the term cycloalkyl represents monovalent $C_3$–$C_8$ saturated cycloaliphatic radicals; the term cycloalkenyl represents $C_5$–$C_8$ cycloaliphatic radicals containing at least one double bond; the term polyalkoxy means a chain of from 2 to 6 alkoxy groups wherein the alkoxy group is ethoxy, propoxy, isopropoxy, butoxy, or the like, with or without an end group such as hydroxy, acyloxy, benzyloxy, benzoyloxy, butoxy, and tetrahydropyranyloxy; the term halogen-containing organic polymers represents halogen-containing vinyl and vinylidene polymers or resins in which the halogen is attached directly to the carbon atoms.

Also, as used herein: an acyloxyalkyl radical originates from a carboxylic acid ester of an alkyl alcohol; the $R^1$ radical in Formula 1 below, therefore, in the stearic acid ester of mercaptopropanol is the stearoyloxypropyl radical; likewise, the $R^1$ radical of the oleic acid ester of mercaptopropanol, which is one the tallate esters of that alcohol, is the oleoyloxypropyl radical; the $R^1$ radical of lauryl-3-mercaptopropionate, on the other hand, is dodecyloxy-carbonylpropyl.

The polymeric compositions of this invention contain polymers normally susceptible to heat-induced deterioration such as the above-noted halogen-containing polymers. The stabilizer compositions of this invention are particularly suited to impart a superior stabilization against the deteriorative effects of heat and ultra-violet light on halogen-containing organic polymers compared to that imparted by stabilizer compositions previously known in the art.

The halogen-containing organic polymers which can be stabilized according to this invention include chlorinated polyethylene having 14 to 75%, e.g. 27%, chlorine by weight, chlorinated natural and synthetic rubber, rubber hydrochloride, chlorinated polystyrene, chlorinated polyvinyl chloride, polyvinyl bromide, polyvinyl fluoride, copolymers of vinyl chloride with 1 to 90%, preferably 1 to 30%, of a copolymerizable ethylenically unsaturated material such as, for example, vinyl acetate, vinyl butyrate, vinyl benzoate, vinylidene chloride, diethyl fumarate, diethyl maleate, other alkyl fumarates and maleates, vinyl propionate, methyl acrylate, 2-ethylhexyl acrylate, butyl acrylate and other alkyl acrylates, methyl methacrylate, ethyl methacrylate, butyl methacrylate and other alkyl methacrylates, methyl alpha-chloroacrylate, styrene, trichloroethylene, vinyl ethers such as vinyl ethyl ether, vinyl chloroethyl ether and vinyl phenyl ether, vinyl ketones such as vinyl methyl ketone and vinyl phenyl ketone, 1-fluoro-2-chloroethylene, acrylonitrile, chloroacrylonitrile, allylidene diacetate and chloroallylidene diacetate. Typical copolymers include vinyl chloride-vinyl acetate (96:4 sold commercially as VYNW), vinyl chloride-vinyl acetate (87:13), vinyl chloride-vinyl acetate-maleic anhydride (86:13:1), vinyl chloride-vinylidene chloride (95:5); vinyl chloride-diethyl fumarate (95:5), and vinyl chloride 2-ethylhexyl acrylate (80:20). In addition to the stabilizer compositions of this invention, there can also be incorporated into the halogen containing organic polymer conventional additives such as plasticizers, pigments, fillers, dyes, ultraviolet light absorbing agents, densifying agents, biocides and the like.

Preferably, the halogen-containing organic polymer is a vinyl halide polymer, more particularly a vinyl chloride polymer. Usually, the vinyl chloride polymer is made from monomers consisting of vinyl chloride alone or a mixture of monomers comprising, preferably, at least about 70% by weight based on the total monomer weight of vinyl chloride.

Formula 1 is representative of the blocked mercaptans that are suitable for the purposes of this invention:

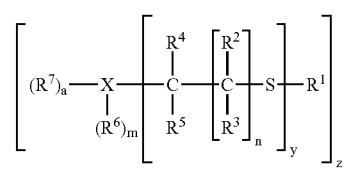

Formula 1 wherein a is 0 or 1, m and n are 0 or 1; y=1 to 4; when y=1, z is 1 to 4; and w than 1, z is 1; $R^1$ is an alkyl, alkylenyl, cycloalkyl, cycloalkylenyl, aryl, alkaryl, aralkyl, aralkylenyl, hydroxyalkyl, dihydroxyalkyl, hydroxy(polyalkoxy)alkyl, alkoxyalkyl, hydroxyalkoxyalkyl, alkoxy(hydroxyalkyl), alkoxy(acyloxyalkyl), alkoxy(polyalkoxy)alkyl, alkoxy(polyalkoxy)carbonylalkyl, carboxyalkyl, acyloxyalkyl, acyloxy(hydroxyalkyl), acyloxyalkoxyalkyl, acyloxy(polyalkoxy)alkyl, benzoyloxy(polyalkoxy)alkyl, alkylenebis(acyloxyalkyl), alkoxycarbonylalkyl, alkoxycarbonylalkylenyl, hydroxyalkoxycarbonylalkyl, hydroxy(polyalkoxy)carbonylalkyl, mercaptoalkyl, mercaptoalkylenyl, mercaptoalkoxycarbonylalkyl, mercaptoalkoxycarbonylalkylenyl, alkoxycarbonyl(amido)alkyl, alkylcarbonyloxy(polyalkoxy)carbonylalkyl, tetrahydropyranyloxycarbonylalkyl, tetrahydropyranyloxy(polyalkoxy)carbonylalkyl, tetrahydropyranyloxyalkyl, hydroxyaryl, mercaptoaryl or carboxyaryl radical having from 1 to 22 carbon atoms; $R^2$, $R^3$, $R^4$, $R^5$, $R^6$, and $R^7$ are independently hydrogen, a hydroxyl, mercapto, acyl, alkyl, alkylenyl, aryl, haloaryl, alkaryl, aralkyl, hydroxyalkyl, mercaptoalkyl, hydroxyaryl, alkoxyaryl, alkoxyhydroxyaryl, mercaptoaryl groups having from 1 to 22 carbon atoms; X is aryl, haloaryl, alkaryl, hydroxyaryl, dihydroxyaryl, alkoxyaryl, arylcycloalkyl, or a heteroatom, with the option that when a is 1 and m is 1, $R^6$ and $R^7$ form a heterocyclic moiety in conjunction with X as nitrogen, and with the further option that when a=1 and m=0, one of $R^1$, $R^3$, and $R^5$ joins with $R^7$ and X to form a heterocyclic moiety with X as a heteroatom selected from the group consisting of oxygen and sulfur; with the proviso that z is 1 or 2 when X is aralkaryl, $R^6$ and $R^7$ are hydroxyl, a is 1 and m is 1, and with the further proviso that when $R^6 \neq$ hydroxyl or mercapto, z is 1.

A polymeric composition wherein the blocked mercaptan has the following structure is another embodiment of this invention:

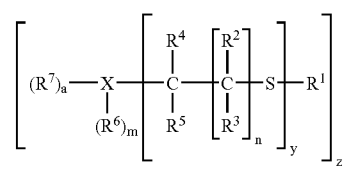

Formula 1 wherein a is 0 or 1, m and n are 0 or 1; y=1 to 4, when y=1, z is 1 to 4 when y 1 z is 1; R1 is an an alkyl, alkylenyl, cycloalkyl, cycloalkylenyl, aryl, alkaryl, aralkyl, aralkylenyl, hydroxyalkyl, dihydroxyalkyl, hydroxy(polyalkoxy)alkyl, alkoxy(polyalkoxy)carbonylalkyl, alkoxyalkyl, hydroxyalkoxyalkyl, alkoxy(hydroxyalkyl), alkoxy(acyloxyalkyl), alkoxy(polyalkoxy)alkyl, carboxyalkyl, acyloxyalkyl, acyloxy(hydroxyalkyl), acyloxyalkoxyalkyl, acyloxy(polyalkoxy)alkyl, benzoyloxy(polyalkoxy)alkyl, alkylenebis-(acyloxyalkyl), alkoxycarbonylalkyl, alkoxycarbonylalkylenyl, hydroxyalkoxycarbonylalkyl, hydroxy(polyalkoxy)carbonylalkyl, mercaptoalkyl, mercaptoalkylenyl, mercaptoalkoxycarbonylalkyl, mercaptoalkoxycarbonylalkylenyl, alkoxycarbonyl(amido)alkyl, alkylcarbonyloxy(polyalkoxy)carbonylalkyl, tetrahydropyranyloxycarbonylalkyl, tetrahydopyranyloxy(polyalkoxy)carbonylalkyl, tetrahydropyranyloxyalkyl, hydroxyaryl, mercaptoaryl or carboxyaryl radical having from 1 to 22 carbon atoms; $R^2$, $R^3$, $R^4$, $R^5$, $R^6$, and $R^7$ are independently hydrogen, a hydroxyl, mercapto, alkyl, alkylenyl, aryl, haloaryl, alkaryl, aralkyl, hydroxyalkyl, mercaptoalkyl, hydroxyalkylmercaptoalkyl, mercaptoalkylenyl, hydroxyaryl, alkoxyaryl, alkoxyhydroxyaryl, arylcarbonyl, or mercaptoaryl radical having from 1 to 22 carbon atoms; when a=1, X is arylcycloalkyl or a heteroatom, and when a=0, X is aryl, haloaryl, alkaryl, alkoxyaryl, arylcycloalkyl, or a heteroatom, with the option that when a is 1 and m is 0, one of $R^3$ and $R^5$ joins with $R^7$ and X to form a heterocyclic moiety with X as a heteroatom selected from the group consisting of oxygen and sulfur, and with the further option that when a is 1 and m is 1, $R^6$ and $R^7$ form a heterocyclic moiety in conjunction with X as a nitrogen atom.

The mercaptan-containing organic compounds which may be converted into latent mercaptans for the purposes of this invention are well-known compounds and include alkyl mercaptans, mercapto esters, mercapto alcohols, and mercapto acids. See, for example, U.S. Pat. Nos. 3,503,924 and 3,507,827. Alkyl mercaptans having from 1 to about 200 carbon atoms and from 1 to 4 mercapto groups are suitable. Mercaptan-containing organic compounds which include $R^1$ have structures illustrated by the following formulas:

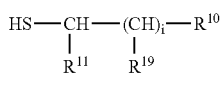
(MC1)

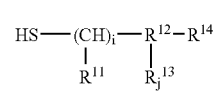
(MC2)

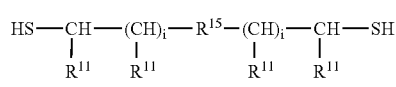
(MC3)

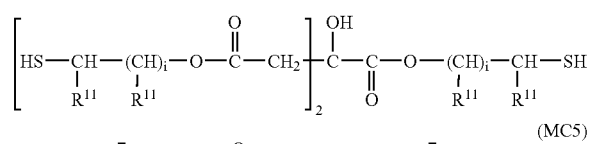
(MC4)

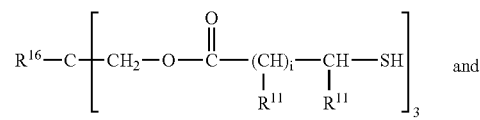
(MC5)

and

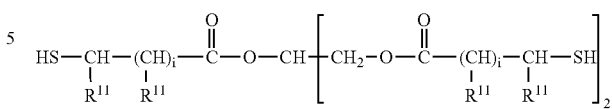
(MC6)

wherein $R^{10}$ and $R^{19}$ are the same or different and are

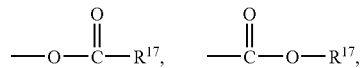

—OH, —SH, aryl, $C_1$ to $C_8$ alkyl, or —H $R^{11}$ is —H, aryl, or $C_1$ to $C_{18}$ alkyl;
$R^{12}$ is cycloalkyl, cycloalkenyl or phenyl;
$R^{13}$ is

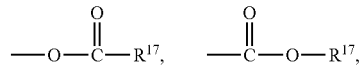

—SH, -aryl, $C_1$ to $C_8$ alkyl, —OH, or —H with the proviso that in formula (MC2) when $R^{12}$ is phenyl, $R^{13}$ is —OH and i=0, then the —SH groups are on non-adjacent carbon atoms;
$R^{14}$ is —H or a divalent group which may contain halogen, hydroxy, mercapto or alkyl substituents and which when $R^{12}$ is phenyl combines with the phenyl to form a naphthalene ring;

$R^{15}$ is 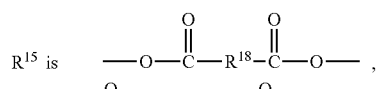

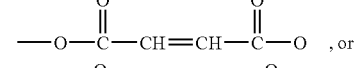 , or

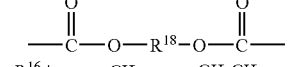

$R^{16}$ is —$CH_3$, —$CH_2CH_3$, or

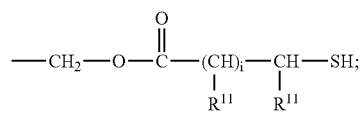

$R^{17}$ is —H, or alkyl, alkenyl, aryl, aralkyl, alkaryl, cycloalkyl, cycloalkyl, cycloalkylenyl;
$R^{18}$ is arylene, $C_1$ to $C_8$ alkylenyl,

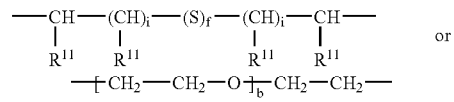

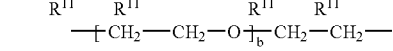

wherein b is an integer from 1 to 6;
i=0 or an integer from 1 to 6 inclusive;
j=0, 1, 2 or 3; and
f=1 or 2.

Mercaptan-containing organic compounds preferred as intermediates in the preparation of the latent mercaptans of this invention are those compounds according to formula (MC1) where $R^{11}$ is —H, $R^{19}$ is —H, $R^{10}$ is OH or

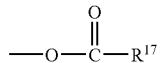

and i=1; those compounds according to formula (MC2) where $R^{12}$ is phenyl, $R^{11}$ is —H, $R^{13}$ is —H, $R^{14}$ is —H, i=1, and j=1; those compounds according to formula (MC3) where $R^{11}$ is —H, $R^{15}$ is

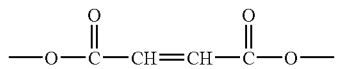

and i=1; those compounds according to formula (MC4) where $R^{11}$ is —H and i=1; those compounds according to formula (MC5) where $R^{16}$ is —$C_2H_5$ or

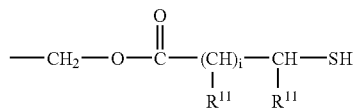

$R^{11}$ is —H and i=1; and those compounds according to formula (MC6) where $R^{11}$ is —H and i=1.

Examples of the mercaptan-containing organic compounds described by formula (MC1) include, but are not limited to, the following compounds:

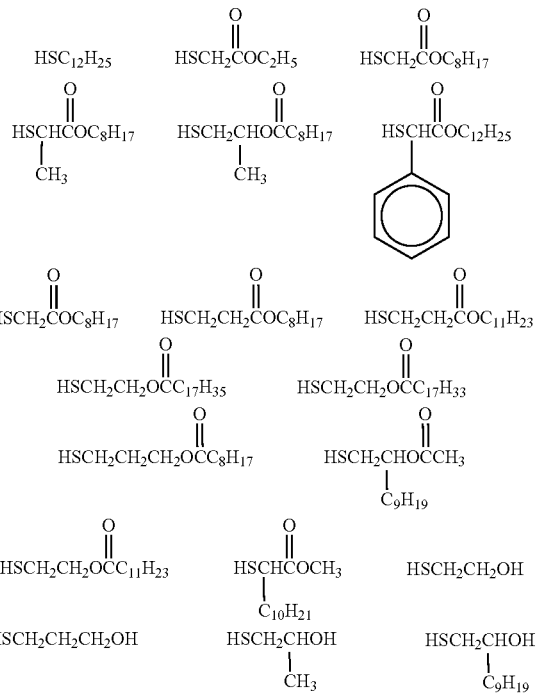

Examples of the mercaptan-containing organic compounds described by formula (MC2) include, but are not limited to, the following compounds:

Examples of mercaptan-containing organic compounds represented by formula (MC3) include, but are not limited to the following compounds:

The mercaptan-containing organic compounds described by formula (MC4) are exemplified by, but not limited to, the following:

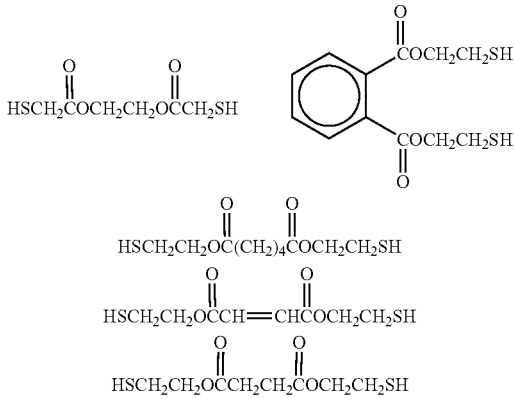

The mercaptan-containing organic compounds represented by formula (MC5) are exemplified by, but are not limited to, the following:

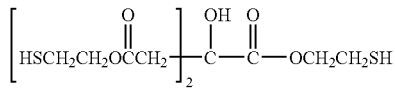

The mercaptan-containing organic compounds represented by formula (MC6) are exemplified by, but are not limited to, the following:

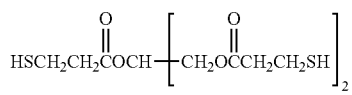

-continued

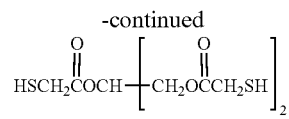

One of the advantages of this invention is that the offensive odor of the mercaptans is masked by the blocking group so that the latent mercaptan thus created may be put into a PVC composition or the like with little or no offense to the operator with the knowledge that the free mercaptan will be released as a degradation product when the treated composition is heated during the usual processing, e.g., extrusion. This advantage is also useful for the liquid polysulfides having a molecular weight of from about 1000 to about 8000 sold under the LP trademark by Morton International, Inc.

The blocking compounds are preferably those which are capable of furnishing a stabilized carbocation having a molecular structure in which the electron deficiency is shared by several groups. Resonance stabilization and neighboring group stabilization are two of the possible mechanisms by which the carbocations may be stabilized. Polarized, unsaturated compounds exemplified by 3,4-dihydropyran, 2-methoxy-3,4-dihydropyran, styrene, α-methylstyrene, vinyl benzyl chloride, indene, 2-vinylpyridine, N-vinylpyrrolidone, vinyl acetate, octadecyl vinyl ether, cyclohexyl divinyl ether, ethyleneglycol monovinyl ether, allyl phenyl ether, trans-cinnamaldehyde, N-methyl-Nvinylacetamide, N-vinylcaprolactam, isoeugenol, and 2-propenylphenol are suitable. Compounds having labile halogen atoms which split off as hydrogen chloride in a condensation reaction with the mercaptan, as exemplified by triphenylmethyl chloride, benzyl chloride, and bis(chloromethyl)benzene, are also suitable. The mercaptan may also be blocked by condensation with an aldehyde such as butyraldehyde or with a benzyl alcohol such as benzene dimethanol. A preferred blocking agent is 2-hydroxybenzyl alcohol, a well known intermediate in the perfume, agricultural, and plastics industries.

In general, the procedure for adding the mercapto group of a free mercaptan across the double bonds of polarized, unsaturated compounds is:

To a stirred mixture of the mercaptan, acid catalyst, and optionally, a small percentage of antioxidant to inhibit radical reactions, under nitrogen atmosphere is added dropwise the polarized, unsaturated compound, either neat or in solution, while maintaining the temperature between 10°–70° C. The mixture or solution is then heated for between 1 to 6 hours at 35°–70° C. and conversion to product is monitored by gas chromatography and iodine titration for SH. The acid catalyst is removed by an alkaline wash and the resulting product is dried with magnesium sulfate and filtered. The solvent, if required, is removed under reduced pressure at <50° C. to yield the latent mercaptan. This generalized procedure is referred to hereinafter as Procedure A.

In accordance with Procedure A, for example, mercaptoethanol is added across the double bond of N-vinylcaprolactam to yield N-2-hydroxyethylthioethylcaprolactam. Mercaptoethyldecanoate (or mercaptoethylcaproate) reacts with 3,4-dihydropyran in that procedure to give 2-S-(tetrahydropyranyl)thioethyldecanoate. Bis(hydroxyethylthioethyl) cyclohexyl ether is made from the mercaptoethanol and cyclohexyl di-vinyl ether. In like manner, the corresponding caprate, oleate, and tallate esters form the corresponding cyclohexyl ethers. Also, indene is converted by the addition of the mercaptoethanol to 2H-dihydroindenylthioethanol.

A generalized procedure for the condensation of a free mercaptan with a labile halogen-containing compound is as follows:

To a stirred mixture of the mercaptan and halogen-containing compound under nitrogen atmosphere is added dropwise a solution of sodium methoxide in methanol while maintaining the temperature below 50° C. Optionally, the reaction is allowed to proceed without the addition of a base source and the liberated hydrogen chloride is removed by nitrogen gas sweep and neutralized with the use of an external acid scrubber. The mixture or solution is then heated for between 2 to 24 hours at 50°–70° C. and conversion to product is monitored by gas chromatography and iodine titration for % SH. The product is then neutralized, washed with water, dried with magnesium sulfate, and filtered. The solvent, if required, is removed under reduced pressure at <50° C. to yield the latent mercaptan. This generalized procedure is referred to hereinafter as Procedure B.

A generalized procedure for the condensation of a free mercaptan with a labile hydroxyl-containing compound is as follows:

To a stirred solution of the mercaptan, acid catalyst, and solvent under nitrogen atmosphere is added the hydroxy-containing compound either neat or in solution while maintaining the temperature <450° C. The solution is then heated to 45°–75° C. for between 1 to 10 hours and conversion to product is monitored by gas chromatography and iodine titration for % SH. Optionally, an azeotropic solvent is chosen for removal of reaction water by an appropriate means at reflux temperatures, typically 60°–120° C. Completion of reaction is achieved after the theory amount of water has been collected. The acid catalyst is removed by alkaline wash and the resulting solution is dried with magnesium sulfate and filtered. The solvent is removed under reduced pressure at <55° C. to yield the latent mercaptan. This procedure is referred to hereinafter as Procedure C.

For example, 2-hydroxybenzyl alcohol condenses with mercaptoethanol in accordance with Procedure C to form 1-(2-hydroxyphenyl)-1-S-(2-hydroxyethylthio)methane.

A generalized procedure for the reaction of a free mercaptan with a glycidyl ether is as follows:

To a stirred mixture of the mercaptan and acid catalyst under nitrogen atmosphere is added the glycidyl ether, either neat or in solution, while maintaining the temperature between 25°–60° C. The mixture or solution is then heated to between 50°–75° C. for a period of 1 to 6 hours and conversion to product is monitored by gas chromatography and iodine titration for % SH. The acid catalyst is removed by alkaline wash, the resulting product is dried with magnesium sulfate, and filtered. The solvent, if required, is removed under reduced pressure at <55° C. to yield the latent mercaptan. For example, the reaction between mercaptoethanol and glycidyl neodecanoate gives $C_9H_{19}C(=O)OCH_2CH(OH)CH_2SCH_2CH_2OH$. This procedure is referred to hereinafter as Procedure D.

A generalized procedure for the condensation of a free mercaptan with an aldehyde is as follows:

To a stirred solution of the mercaptan, acid catalyst, and azeotropic solvent under nitrogen atmosphere is added the aldehyde with heating to reflux, typically between 65°–120° C., for removal of reaction water. Completion of reaction is achieved after the theory amount of water has been collected. Optionally, to a stirred solution of mercaptan, aldehyde, and ether is added BF$_3$-etherate dropwise under reflux conditions. The solution is refluxed for between 1 to 6 hours and conversion to product is monitored by gas chromatography. The acid catalyst is removed by alkaline wash, the solution is dried with magnesium sulfate and filtered. The solvent is removed under reduced pressure at <65° C. to yield the latent mercaptan. This generalized procedure is referred to hereinafter as Procedure E.

Examples of the blocked mercaptans of this invention include compounds having the following formulas, as each relates to FORMULA 1:

Formula 2:

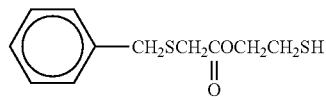

a=0, m=0, n=0, y=1, z=1; X is phenyl, R$^4$ and R$^5$ are hydrogen, and R$^1$ is mercaptoethoxycarbonylmethyl.

Formula 3:

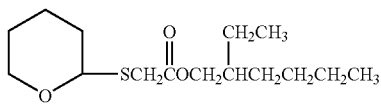

a=1, m=0, n=0, y=1, z=1; X is oxygen, R$^4$ is hydrogen, R$^5$ and R$^7$ link to form the tetrahydropyranyl ring with X, and R$^1$ is 2ethylhexoxycarbonylmethyl.

Formula 4:

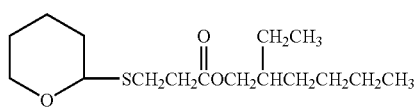

a=1, m=0, n=0, y=1, z=1, X is oxygen, R$^4$ is hydrogen, R$^5$ and R$^7$ link to form the tetrahydropyranyl ring with X, and R$^1$ is 2-ethylhexoxycarbonylethyl.

Formula 5:

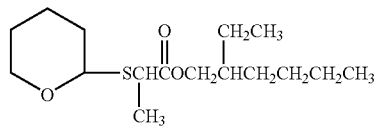

a=1, m=0, n=0, y=1, z=1, X is oxygen, R$^4$ is hydrogen, R$^5$ and R$^7$ link to form the tetrahydropyranyl ring with X, and R$^1$ is 2-ethylhexoxycarbonyl-1-ethyl.

Formula 6:

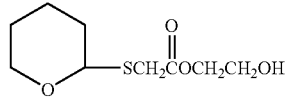

a=1, m=0, n=0, y=1, z=1, X is oxygen, R$^4$ is hydrogen, R$^5$ and R$^7$ link to form the tetrahydropyranyl ring with X, and R$^1$ is hydroxyethoxycarbonylmethyl.

Formula 7:

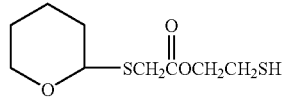

a=1, m=0, n=0, y=1, z=1, X is oxygen, R$^4$ is hydrogen, R$^5$ and R$^7$ link to form the tetrahydropyranyl ring with X, and R$^1$ is mercaptoethoxycarbonylmethyl.

Formula 8:

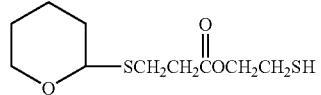

a=1, m=0, n=0, y=1, z=1, X is oxygen, R$^4$ is hydrogen, R$^5$ and R$^7$ link to form the tetrahydropyranyl ring with X, and R$^1$ is mercaptoethoxycarbonylethyl.

Formula 9:

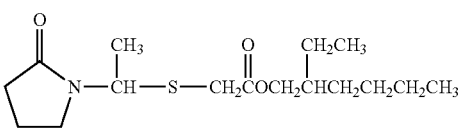

a=1, m=1, n=0, y=1, z=1, X is nitrogen, R$^6$ and R$^7$ are joined go form —CH$_2$—CH$_2$—CH$_2$—C(O)—, R$^4$ is hydrogen, R$^5$ is methyl, and R$^1$ is 2-ethylhexoxycarbonylmethyl.

Formula 10:

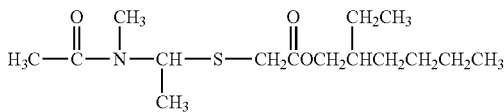

a=1, m=1, n=0, y=1, z=1, X is nitrogen, R$^6$ is acetyl, R$^7$ is methyl, R$^5$ is hydrogen, and R$^1$ is 2-ethylhexoxycarbonylmethyl.

Formula 11:

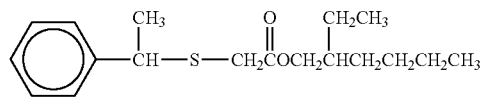

a=0, m=0, n=0, y=1, z=1, X is phenyl, $R^4$ is methyl, $R^5$ is hydrogen, and $R^1$ is 2-ethylhexoxycarbonylmethyl.

Formula 12:

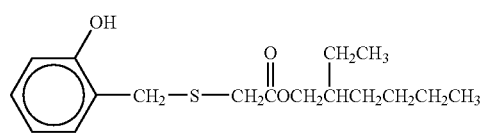

a=1, m=0, n=0, y=1, z=1, X is phenyl, $R^4$ and $R^5$ are hydrogen, $R^7$ is o-hydroxy, and $R^1$ is 2-ethylhexoxycarbonylmethyl.

Formula 13:

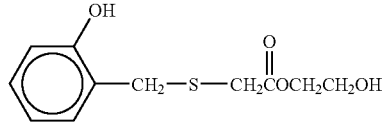

a=1, m=0, n=0, y=1, z=1, X is phenyl, $R^4$ and $R^5$ are hydrogen, $R^7$ is o-hydroxy, and $R^1$ is hydroxyethoxycarbonylmethyl.

Formula 14:

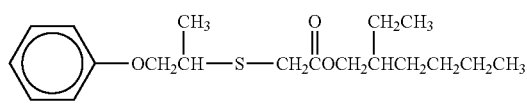

a=1, m=0, n=1, y=1, z=1, X is oxygen, $R^2$, $R^4$, and $R^5$ are hydrogen, $R^7$ is phenyl, and $R^1$ is 2-ethylhexoxycarbonylmethyl.

Formula 15:

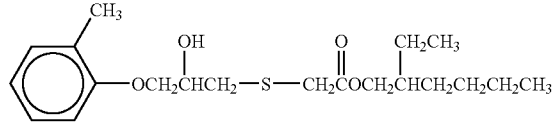

a=0, m=1, n=1, y=1, z=1, X is oxygen, $R^2$, $R^3$, $R^6$, and $R^4$ are hydrogen, $R^5$ is 2-methyleneoxytolyl, and $R^1$ is 2-ethylhexoxycarbonylmethyl.

Formula 16:

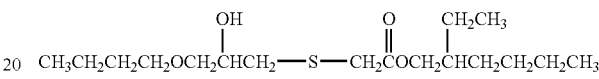

a=1, m=0, n=1, y=1, z=1, X is oxygen, $R^2$, $R^3$, $R^4$, and $R^7$ are hydrogen, $R^5$ is butoxymethyl, and $R^1$ is 2-ethylhexoxycarbonylmethyl.

Formula 17:

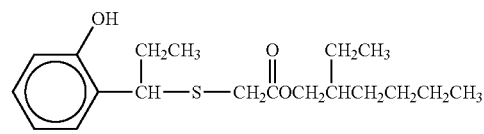

a=1, m=0, n=0, y=1, z=1, X is phenyl, $R^4$ is hydrogen, $R^5$ is ethyl, $R^7$ is o-hydroxy and $R^1$ is 2-ethylhexoxycarbonylmethyl.

Formula 18:

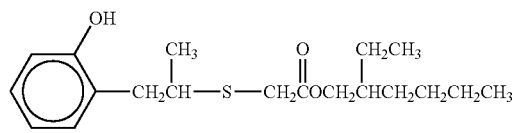

a=1, m=0, n=1, y=1, z=1, X is phenyl, $R^3$, $R^4$, and $R^5$ are hydrogen, $R^2$ is methyl, $R^7$ is o-hydroxy, and $R^1$ is 2-ethylhexoxycarbonylmethyl.

Formula 19:

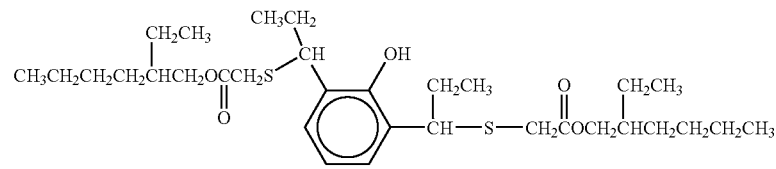

a=1, m=0, n=0, y=1, z=2, X is phenyl, $R^4$ is hydrogen, $R^5$ is ethyl, $R^7$ is o-hydroxy, and $R^1$ is 2-ethylhexoxycarbonylmethyl.

Formula 20:

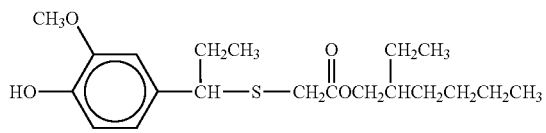

a=1, m=0, n=0, y=1, z=1, X is m-methoxyphenyl, R4 is hydrogen, R5 is ethyl, R7 is p-hydroxy, and $R^1$ is 2-ethylhexoxycarbonylmethyl.

Formula 21:

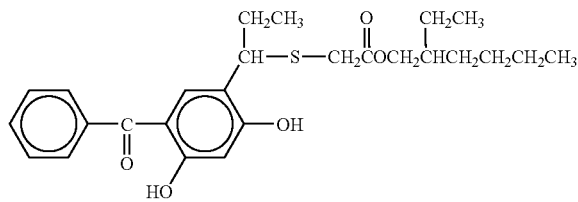

a=1, m=0, n=0, y=1, z=1, X is o,p-dihydroxyphenyl, $R^7$ is m-phenylcarbonyl, $R^4$ is hydrogen, $R^5$ is —$CH_2CH_3$, and $R^1$ is 2-ethylhexoxycarbonylmethyl.

Formula 22:

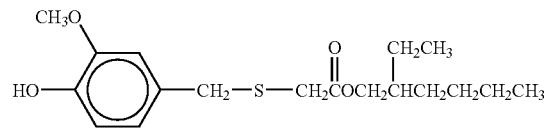

a=1, m=0, n=0, y=1, z=1, X is p-hydroxyphenyl, $R^4$ and $R^5$ are hydrogen, $R^7$ m-methoxy, and $R^1$ is 2-ethylhexoxycarbonylmethyl.

The stabilizer compositions of the present invention contain a latent mercaptan and a zinc compound. Some zinc compounds, such as for example, salts of zinc and fatty acids, are known in the art as stabilizers, and such zinc-containing compounds are suitable for use as the zinc compound of the present invention. Additionally, we have discovered that other zinc-containing compounds, such as, for example, zinc chloride, not previously thought to be useful as stabilizers, can be useful as part of a stabilizer system of the present invention.

Zinc compounds suitable for inclusion in the stabilizer system of the present invention include, for example, inorganic zinc salts and organic zinc compounds. Suitable inorganic zinc salts include, for example, zinc salts with the following anions: ammonium chloride, diborate, halide (including bromide, chloride, fluoride, and iodide), carbonate, cyanide, fluorborate, hydrosulfite, nitrate, oxide, peroxide, phosphate, potassium chromate, selenide, sulfate, sulfide, tetraoxychromate, and hydrated forms thereof. In some embodiments, zinc halides are known to be suitable as the zinc containing compounds of the present invention; among these embodiments, zinc chloride is known to be suitable as the zinc containing compound of the present invention.

Some organic zinc compounds known to be suitable as the zinc compound of the present invention include, for example, zinc carboxylates (i.e., salts of zinc with carboxylic acids; suitable carboxylic acids include, for example, formic acid, acetic acid, 2-ethylhexanoic acid, other alkyl carboxylic acids, naphthenic acid, cycloparaffin carboxylic acids, resin acids, stearic acid, undecylenic acid, and other fatty acids, including saturated and unsaturated fatty acids).

Some other organic zinc compounds known to be suitable as the zinc compound of the present invention include, for example, zinc dithiocarbamates, including, for example, zinc dibutyldithiocarbamate, zinc diethyldithiocarbamate, and zinc dimethyldithiocarbamate. Still another group of suitable organic zinc compounds is the group known herein as "zinc/carbonyl" compounds, which are compounds that contain zinc and also contain at least one organic subcompound that contains one or more carbonyl group; such subcompounds may be capable of existing as organic compounds in the absence of zinc. One group of suitable organic subcompounds is the group of diketones, including, for example, β-diketones, which are compounds with the structure

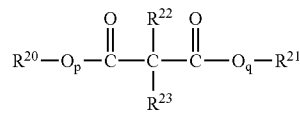

where p and q are, independently, 0 or 1, and $R^{20}$, $R^{21}$, $R^{22}$, and $R^{23}$ are, independently, hydrogen, alkyl, aryl, alkenyl, aralkyl, alkaryl, or substituted versions thereof. Some suitable β-diketones are, for example, those in which p and q are both zero, in which $R^{22}$ and $R^{23}$ are both hydrogen, and in which $R^{20}$ and $R^{21}$ are, independently, methyl, phenyl, or stearyl. Zinc/carbonyl compounds in which the subcompound containing at least one carbonyl group is a β-diketone are called herein "zinc β-diketones." Some zinc β-diketones suitable as the zinc compound of the present invention are, for example, zinc 2,4-pentanedione, zinc dibenzoyl methane, and zinc stearoyl benzoyl methane.

In the practice of the present invention, some embodiments use a single zinc compound; such a single zinc compound, in some embodiments, will be zinc chloride; in other embodiments, a zinc carboxylate; in still other embodiments, a zinc compound that is neither zinc chloride nor zinc carboxylate.

Other embodiments of the present invention use a mixture of zinc compounds. Some examples of suitable mixtures of zinc compounds include the following:
(i) a mixture that contains zinc chloride and one or more additional zinc compounds, none of which additional zinc compounds is a zinc carboxylate; or
(ii) a mixture that contains a first zinc compound that is a zinc carboxylate and at least one additional zinc compound, where each additional zinc compound is not zinc chloride, and where each additional zinc compound may or may not be another zinc carboxylate; or
(iii) a mixture of zinc compounds that contains no zinc chloride and no zinc carboxylate.

Some additional embodiments of the present invention involve the use of a mixture of zinc compounds that includes both zinc chloride and one or more zinc carboxylates. One useful way to characterize such mixtures is the ratio of zinc contributed by zinc carboxylate (i.e., zinc contributed by any and all zinc carboxylates) to zinc contributed by zinc chloride. In the practice of the present invention, that ratio either is between 0:100 and 10:90 or is between 80:20 and 100:0. In some of such embodiments, that ratio is between 0:100 and 5:95; or is between 0:100 and 2:98, or is between 90:10 and 100:0; or is between 95:5 and 100:0.

In some embodiments of the present invention, the amount of zinc compound is 0.1% or more by weight, based on the weight of polymer component. Independently, in some embodiments, the amount of zinc compound is 10% or less by weight, based on the weight of polymer component; in some of these embodiments, the amount of zinc compound is 5% or less by weight, based on the weight of polymer component. In embodiments where the zinc compound is a mixture of zinc compounds, the "amount of zinc compound" herein means the total amount of all zinc compounds.

In some embodiments of the present invention, the composition contains, in addition to at least one latent mercaptan and at least one zinc compound, one or more non-zinc-containing metal-based stabilizers. Metal-based stabilizers are defined for the purposes of this invention as metal salt stabilizers and organometallic stabilizers. Non-zinc-containing metal salt stabilizers are exemplified by barium, strontium, calcium, cadmium, lead, tin, magnesium, cobalt, nickel, titanium, antimony, and aluminum salts of phenols, aromatic carboxylic acids, fatty acids, epoxidized fatty acids, oxalic acid, carbonic acid, sulfuric acid, and phosphoric acid. Non-zinc-containing organometallic stabilizers include, for example, organotin compounds, such as, for example, those set forth in U.S. Pat. No. 4,360,619. Additional examples of non-zinc-containing organometallic stabilizers include, for example, organotin carboxylates and mercaptides, such as, for example, mono-alkyltin mercaptoalkyl carboxylates, di-alkyltin mercaptoalkyl carboxylates, monosulfides thereof, polysulfides thereof, and mixtures thereof, as described, for example, in U.S. patent application Ser. No. 09/968,220. Further examples of non-zinc-containing organometallic stabilizers include, for example, butyltin tris dodecyl mercaptide, dibutyltin dilaurate, dibutyltin didodecyl mercaptide, dianhydride tris dibutylstannate diol, and dihydrocarbontin salts of carboxy mercaptals such as those set forth in Hechenbleikner et. al. (U.S. Pat. No. 3,078,290).

In some embodiments of the present invention, the composition contains no barium salts. Independently, in some embodiments of the present invention, the composition contains no calcium salts. Independently, in some embodiments of the present invention, the composition contains no calcium salts and no barium salts. Independently, in some embodiments of the present invention, the composition contains no non-zinc-containing metal salts. Independently, in some embodiments of the present invention, the composition contains no organotin carboxylates and no organotin mercaptides. Independently, in some embodiments of the present invention, the composition contains no non-zinc-containing metal-based stabilizer.

Conventional non-metallic stabilizers and antioxidants can also be included in the stabilizer compositions of the present invention to assist in improving the properties of the halogen containing resin. Thus, there can be included 0.01–10%, preferably 0.1–5% based on the resin of sulfur containing compounds such as dilauryl-thiodipropionate, distearyl 3,3'-thiodipropionate, dicyclohexyl-3,3-thiodipropionate, dioleyl-3,3'-thiodipropionate, dibenzyl-3,3'-thio-dipropionate, didecyl-3,3'-thiodipropionate, dibenzyl-3,3'-thiodipropionate, diethyl-3,3'-thiopropionate, lauryl ester of 3-methylmercaptopropionic acid, lauryl ester of 3-butylmercaptopropionic acid, lauryl ester of 3-lauryl mercaptopropionic acid, and phenyl ester of 3-octyl mercaptopropionic acid.

Phenolic antioxidants can also be added in an amount of 0.01–10%, preferably 0.1–5% of the halogen-containing resin. Examples of such antioxidants include 2,6-di-t-butyl-p-cresol, butylated hydroxyanisole, propyl gallate, 4,4'-thio-bis(6-t-butyl-m-cresol), 4,4'-cyclohexylidene diphenol, 2,5-di-t-amyl hydroquinone, 4,4'-butylidene bis(6-t-butyl-m-cresol), hydroquinone monobenzyl ether, 2,2'-methylene-bis (4-methyl-6-t-butyl phenol.), 2,6-butyl-4-decyloxy phenol, 2-t-butyl-4-dodecyloxy phenol, 2-t-butyl-4-dodecyloxy phenol, 2-t-butyl-4-octadecyloxy phenol, 4,4'-methylene-bis (2,6-di-t-butyl phenol), p-amino phenol, N-lauryloxy-p-amino phenol, 4,4'-thiobis(3-methyl-6-t-butyl phenol), bis [o-(1,1,3,3-tetramethyl butyl)phenol]sulfide, 4-acetyl-β-resorcylic acid, A-stage p-t-butylphenolformaldehyde resin, 4-dodecyloxy-2-hydroxybenzophenone, 3-hydroxy-4-(phenylcarbonyl) phenyl palmitate, n-dodecyl ester of 3-hydroxy-4-(phenyl carbonyl) phenoxyacetic acid, and t-butyl phenol.

In some embodiments of the present invention, the composition optionally contains 0.1% to 10% by weight, based on the weight of the halogen-containing resin, one or more alien free mercaptans (i.e., mercaptans that are added to the composition in addition to the free mercaptans produced by degradation the blocked mercaptan). Any one or more of the mercaptan-containing compounds described herein above as precursors of latent mercaptans may also be used as an optional alien free mercaptan.

The use of epoxy compounds in an amount of 0.01–5% in the polymer compositions is also valuable. Examples of such epoxy compounds include epoxidized soya bean oil, epoxidized lard oil, epoxidized olive oil, epoxidized linseed oil, epoxidized castor oil, epoxidized peanut oil, epoxidized corn oil, epoxidized tung oil, epoxidized cottonseed oil, epichlorhydrin/bis-phenol A resins, phenoxy-propylene oxide, butoxypropylene oxide, epoxidized neopentylene oleate, glycidyl epoxystearate, epoxidized α-olefins, epoxidized glycidyl soyate, dicyclopentadiene dioxide, epoxidized butyl toluate, styrene oxide, dipentene dioxide, glycidol, vinyl cyclo-hexene dioxide, glycidyl ether of resorcinol, glycidol ether of hydroquinone, glycidyl ether of 1,5-dihyroxynaphthalene, epoxidized linseed oil fatty acids, allyl glycidyl ether, butyl glycidyl ether, cyclohexane oxide, 4-(2,3-epoxypropoxy) acetophenone, mesityl oxide epoxide, 2-ethyl-3-propyl glycidamide, glycidyl ethers of glycerine, pentaerythritol and sorbitol, and 3,4-epoxycyclohexane-1, 1-dimethanol bis-9,10-epoxystearate.

Likewise there can be used organic phosphites in an amount of 0.01 to 10%, preferably 0.1–5% of the halogen containing resins. The organic phosphites contain one or more, up to a total of three, aryl, alkyl, aralkyl and alkaryl groups, in any combination. The term "trialkylaryl" is inclusive of alkyl, aryl, alkaryl and aralkyl phosphites containing any assortment of alkyl, aryl, alkaryl and aralkyl groups. Exemplary are triphenyl phosphite, tricresyl phosphite, tri (dimethylphenyl) phosphite, tributyl phosphite, trioctyl phosphite, tridodecyl phosphite, octyl diphenyl phosphite, dioctyl phenyl phosphite, tri(octyl-phenyl) phosphite, tri (nonylphenyl) phosphate, tribenzyl phosphite, butyl dicresyl phosphite, octyl di(octyl-phenyl) phosphite, tri(2-ethylhexyl) phosphite, tritolyl phosphite, tri(2-cyclohexylphenyl)

phosphite, tri-alpha-naphthyl phosphite, tri(phenylphenyl) phosphite, and tri(2-phenylethyl) phosphite.

In some embodiments of the present invention, the composition contains 0.1% to 10% by weight, based on the weight of the halogen-containing resin, at least one diketone, including, for example β-diketones, as described herein above.

Likewise there can be included polyol stabilizers for vinyl chloride resins in an amount of 0.01–10%. Thus there can be included glycerol, sorbitol, pentaerythritol and mannitol.

Nitrogen containing stabilizers such as uracils, dicyandiamide, metamine, urea, formoguanamine, dimethyl hydantoin, guanidine, thiourea, 2-phenylindoles, aminocrotonates, N-alkyl and N-phenyl substituted maleimides, wherein the alkyl group has from 1 to 4 carbon atoms, and the like also can be included in amounts of 0.1–10%. There can even be included conventional lubricants for vinyl chloride resins such as low molecular weight polyethylene, i.e. polyethylene wax, fatty acid amides, e.g. lauramide and stearamide, bisamides, e.g. decamethylene, bis amide, and fatty acid esters, e.g. butyl stearate, glyceryl stearate, linseed oil, palm oil, decyloleate, corn oil, cottonseed oil., hydrogenated cottonseed oil, etc.

In some embodiments of the present invention, the stabilizer composition contains about 10% or more, or about 35% or more, by weight of one or more latent mercaptans, based on the total weight of the stabilizer composition. Independently, in some embodiments, the stabilizer composition contains 100% or less, or about 85% or less, by weight of one or more latent mercaptans, based on the total weight of the stabilizer composition. The balance of the stabilizer composition includes the zinc compound or compounds, the optional one or more stabilizers that are not zinc compounds, and the optional one or more other compounds (such as, for example, antioxidants) described herein above that are not zinc compounds and are suitable for inclusion in some embodiments of the present invention.

The stabilizer compositions of this invention may be prepared by blending the components thereof in any manner which produces a homogeneous mixture, such as by shaking or stirring in a container. Likewise, the compositions of this invention can be incorporated in the halogen-containing organic polymer by admixing the stabilizer composition and polymer, such as, for example, in an appropriate mill or mixer or by any other of the well-known methods which provide uniform distribution of the stabilizer throughout the polymer.

The stabilizer compositions of this invention are employed in an amount sufficient to impart the desired resistance to heat deterioration to halogen-containing organic polymers. It will be readily apparent to one of ordinary skill in the art, that the precise amount of stabilizer composition used will depend upon several factors, including, but not limited to, the particular halogen-containing organic polymer employed, the temperature to which the polymer will be subjected, and the possible presence of other stabilizing compounds. In general, the more severe the conditions to which the halogen-containing organic polymer is subjected, and the longer the term required for resisting degradation, the greater will be the amount of stabilizer composition required. Generally, as little as about 0.20 part by weight of the stabilizer composition per hundred parts by weight of halogen-containing organic polymer will be effective. While there is no critical upper limit to the amount of stabilizer composition which can be employed, amounts in excess of about 10 parts by weight of halogen-containing organic polymer do not give an increase in effectiveness commensurate with the additional amount of stabilizer employed.

The following examples further illustrate the preparation of blocked mercaptans of this invention, the preparation of stabilizer compositions of this invention, and the advantages of said blocked mercaptans and stabilizer compositions.

EXAMPLES

In the following examples, these ingredients were used

| Ingredient | Description | Supplier |
| --- | --- | --- |
| PVC 1 | Geon ™ 30 L39R118 | PolyOne |
| Jayflex ™ | di-isodecyl phthalate | Exxon Mobil |
| Stearic Acid | | Henkel |
| AC-629A | oxidized polyethylene wax | Honeywell |
| ESO | epoxidized soybean oil | Union Carbide |
| PVC2 | SE 950 | Shintech |
| Omya ™ FT | $CaCO_3$ | Omya |
| Synpron ™ 15F | Calcium Stearate | Ferro |
| XL-165 | parafin wax | Clariant |
| THEIC | tris hydroxyl ethyl | BASF |
| PVC3 | Norvinyl ™ 6775 | Hydro Polymers Co. |

Example 1

The latent mercaptide S-(1-tetra hydropyranyl)thioglycolic acid 2-ethyl hexyl ester (Formula 3, herein above) was made by Procedure A, described herein above.

Example 2 and Comparatives CA, CB, and CC

The following formulations were prepared:

| Ingredient | Example 2 | Comparative CA | Comparative CB | Comparative CC |
| --- | --- | --- | --- | --- |
| PVC 1 | 100 | 100 | 100 | 100 |
| Jayflex ™ | 40 | 40 | 40 | 40 |
| stearic acid | 0.25 | 0.25 | 0.25 | 0.25 |
| AC-629A | 0.15 | 0.15 | 0.15 | 0.15 |
| Example 1 | 1.3 | 1.3 | 1.3 | 1.3 |
| ESO | 4 | 4 | 4 | 4 |
| Zn Stearate | 0.5 | — | — | — |
| Ca Stearate | — | — | 0.5 | — |
| Ba Stearate | — | — | — | 0.5 |

The formulations were tested in a Brabender™ Rheometer with a bowl temperature of 170° C. and mixing speed of 60 rpm. The compound was charged to the rheometer bowl and allowed to mix. Small samples were removed at 2 minute intervals and pressed between glass plates. A chip was punched from each sample and mounted on a card, and the remaining portion of each sample was returned to the bowl. The color of each chip was measured with a Hunter™ Colorimeter (Hunter Lab Associates, Inc.) standardized to both white and black standard color tiles. The whiteness index (WI) and total color change (dE) were reported. The results were as follows:

| minutes | Ex. 2 WI | Ex. 2 dE | CA WI | CA dE | CB WI | CB dE | CC WI | CC dE |
|---|---|---|---|---|---|---|---|---|
| 2 | 24.5 | 31.4 | 9.0 | 33.3 | 13.4 | 30.6 | 7.4 | 33.5 |
| 4 | 23.3 | 31.0 | −6.9 | 36.8 | 1.7 | 31.9 | −3.7 | 33.7 |
| 6 | 21.4 | 31.1 | −21.3 | 39.5 | −17.8 | 40.4 | −16.3 | 37.0 |
| 8 | 22.3 | 30.7 | −28.3 | 41.3 | −19.4 | 35.8 | −16.1 | 37.2 |
| 10 | 19.4 | 30.6 | −36.0 | 43.1 | −31.5 | 42.9 | −22.7 | 35.2 |
| 12 | 17.0 | 31.7 | −39.9 | 43.5 | −39.0 | 41.5 | −29.9 | 39.3 |
| 14 | 17.3 | 29.9 | −42.7 | 42.6 | −43.1 | 42.3 | −31.0 | 39.9 |
| 16 | 13.4 | 30.5 | −41.7 | 45.1 | −45.8 | 47.2 | −35.8 | 39.9 |
| 18 | −0.9 | 32.1 | −44.5 | 46.4 | −51.9 | 46.3 | −41.7 | 42.5 |

Throughout the experiment, Example 2 had the best WI and dE.

Example 3 and Comparatives CD, CE, and CF

The following formulations were prepared:

| Ingredient | Example 3 | Comparative CD | Comparative CE | Comparative CF |
|---|---|---|---|---|
| PVC1 | 100 | 100 | 100 | 100 |
| Jayflex ™ | 40 | 40 | 40 | 40 |
| stearic acid | 0.25 | 0.25 | 0.25 | 0.25 |
| AC-629A | 0.15 | 0.15 | 0.15 | 0.15 |
| Example 1 | 1.3 | 1.3 | 1.3 | 1.3 |
| ESO | 4 | 4 | 4 | 4 |
| Zn Stearate | 0.005 | — | — | — |
| Ca Stearate | — | — | 0.005 | — |
| Ba Stearate | — | — | — | 0.005 |

The formulations were tested in a Brabender™ Rheometer as described in Example 2 above, with the following results:

| minutes | Ex. 3 WI | Ex. 3 dE | CD WI | CD dE | CE WI | CE dE | CF WI | CF dE |
|---|---|---|---|---|---|---|---|---|
| 2 | 26.5 | 29.8 | 13.7 | 31.3 | 15.1 | 30.5 | 4.1 | 33.1 |
| 4 | 11.4 | 30.7 | −3.5 | 33.2 | −7.8 | 34.2 | −9.6 | 35.1 |
| 6 | −6.8 | 32.8 | −23.0 | 37.6 | −21.8 | 35.9 | −25.4 | 38.5 |
| 8 | −15.6 | 34.0 | −29.6 | 38.8 | −34.9 | 39.4 | −39.9 | 41.7 |
| 10 | −21.5 | 35.4 | −29.7 | 38.9 | −44.9 | 43.0 | −46.7 | 44.5 |
| 12 | −27.4 | 37.2 | −36.2 | 39.6 | −51.6 | 45.3 | −53.1 | 46.7 |
| 14 | −35.1 | 39.3 | −36.8 | 40.6 | −52.7 | 46.7 | −55.1 | 48.5 |
| 16 | −31.8 | 38.9 | −33.5 | 39.9 | −53.3 | 46.0 | −59.2 | 51.0 |
| 18 | −28.2 | 38.1 | −35.6 | 41.6 | −51.2 | 45.6 | −59.8 | 51.2 |
| 20 | −32.9 | 39.0 | −33.8 | 41.1 | −51.9 | 47.2 | −61.6 | 51.8 |
| 22 | −37.1 | 40.4 | −24.7 | 39.7 | −53.3 | 46.6 | −63.1 | 51.5 |
| 24 | −39.0 | 40.7 | −21.6 | 39.7 | −53.8 | 47.7 | −55.1 | 48.6 |

Through the first 20 minutes of the experiment, Example 3 showed better WI and better dE than Comparatives CD, CE, and CF.

Examples 4 and 5

The following formulations were prepared:

| Ingredient | Example 4 | Example 5 |
|---|---|---|
| PVC2 | 100 | 100 |
| Omya ™ FT | 5 | 5 |
| TiO$_2$ | 0.2 | 0.2 |
| Synpron ™ 15F | 0.45 | 0.45 |
| XL-165 | 1.1 | 1.1 |
| AC 629A | 0.10 | 0.10 |
| Stearic Acid | 0.05 | 0.05 |
| Example 1 | 0.5 | 0.5 |
| THEIC | 0.20 | 0.20 |
| Zn Octoate | 0.15 | — |
| Zn-2,4-pentanedione | — | 0.12 |

The formulations are designed with equal levels of Zn atoms per hundred parts of resin.

The formulations were tested in a 2-roll mill at 199° C., with front-roll rotation of 30 rpm and back roll rotation of 40 rpm. 330 g of compound were charged to the rolls; once the material was fused, it was cut and folded every three seconds. At 1 minute intervals, samples are taken while rolls remain in motion. Each sample is placed under glass to cool. A chip was removed from each sample and tested for color as described in Example 2. Results were as follows:

| minutes | Ex. 4 WI | Ex. 4 dE | Ex. 5 WI | Ex. 5 dE |
|---|---|---|---|---|
| 1 | 26.0 | 16.9 | 55.4 | 13.7 |
| 2 | −12.0 | 23.0 | 49.5 | 14.0 |
| 3 | 2.6 | 20.3 | 39.8 | 15.5 |
| 4 | 11.8 | 19.5 | 11.0 | 19.9 |
| 5 | −17.2 | 25.9 | −39.1 | 30.3 |
| 6 | −51.4 | 34.4 | −61.6 | 39.9 |
| 7 | −56.6 | 43.2 | −53.3 | 46.6 |

Both examples show useful WI and dE values. Through 3 minutes, Example 5 has better WI and dE values, showing that Example 5 delays the onset of color development longer than Example 4 does.

Examples 6, 7, and 8

The following formulations were prepared:

| Ingredient | Example 6 | Example 7 | Example 8 |
|---|---|---|---|
| PVC3 | 100 | 100 | 100 |
| Omya ™ FT | 5 | 5 | 5 |
| XL-165 | 1.1 | 1.1 | 1.1 |
| Ca Stearate | 0.4 | 0.4 | 0.4 |
| AC 629A | 0.15 | 0.15 | 0.15 |
| Example 1 | 0.5 | 0.5 | 0.5 |
| Zn Chloride | 0.10 | — | — |
| Zn Stearate | — | 0.23 | — |
| Zn Octoate | — | — | 0.13 |

The formulations are designed with equal levels of Zn atoms per hundred parts of resin.

The formulations were tested in a 2-roll mill and measured for color as in Example 5. Results were as follows:

| minutes | Ex. 6 WI | Ex. 6 dE | Ex. 7 WI | Ex. 7 dE | Ex. 8 WI | Ex. 8 dE |
|---|---|---|---|---|---|---|
| 1 | 31.2 | 19.3 | −9.5 | 25.6 | −19.9 | 27.0 |
| 2 | 25.2 | 19.3 | −70.8 | 40.4 | −70.1 | 38.4 |
| 3 | 4.8 | 22.2 | −78.7 | 41.3 | −70.1 | 37.5 |
| 4 | −37.0 | 30.6 | −78.4 | 38.8 | −60.8 | 34.6 |

All three formulations show useful values of WI and dE. Example 6 shows the best values of WI and dE at all tested times.

Example 9

The adduct of 3,4-dihydropyran (DHP) and lauryl-3mercaptopropionate was made by adding 8.6 grams (0.0102 mole) of the DHP over a 20 minute period to 29.0 grams (0.1 mole) of the ester and 0.1 gram of methane sulfonic acid in an ice-cooled reactor; the exotherm warmed the mixture to room temperature and heat was applied to continue the eaction at 40–45° C. for 4 hours. The SH content of the product was only 0.44% by weight. The formula for the product is

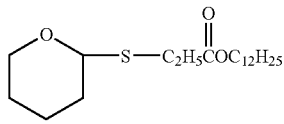

wherein a is 1, m and n are 0, z is 1, X is oxygen, $R^3$ and $R^7$ join with X to form a heterocyclic moiety, and $R^1$ is dodecyloxycarbonylethyl.

Example 10

An equimolar mixture of thioglycolic acid (124 grams) and diethyleneglycol (106 grams) and a catalytic amount of methanesulfonic acid is heated to 100° C. at a pressure of 400 Torr and then heated further to 120° C. as the pressure is reduced to 10 Torr over a period of 2 hours to reduce the acid number to less than 10. The product is washed and dried. The mono-ester is the predominant product. The mixture of reaction products is then reacted with an excess of 3,4-dihyropyran to obtain an adduct having an —SH content less than 0.1% by weight. $R^1$ of Formula 1 for the principal product is hydroxy(polyethoxy)carbonylmethyl. A bright white pipe is obtained from the extrusion of a rigid PVC pipe formulation containing this product as a heat stabilizer.

Example 11

A product having a structure and properties similar to those of the product of Example 10 is obtained when the same procedure is followed with the exception of using triethyleneglycol in place of diethyleneglycol. In this case, $R^1$ of Formula 1 for the principal product is a hydroxy (polyalkoxy)carbonylalkyl radical wherein the polyalkoxy chain has three units.

The acyloxy and benzoyloxy derivatives of the hydroxy (polyalkoxy)carbonylalkyl moiety are made by the conventional esterification methods wherein the appropriate carboxylic acid is reacted with the hydroxyl group. The tetrahydropyranyloxy(polyalkoxy)carbonylalkyl is made by a procedure similar to Procedure A hereinabove except for the use of the glycol derivative instead of a mercaptan. The esterification of the hydroxy(polyalkoxy) moiety with an alcohol such as propanol, benzyl alcohol, or butanol is accomplished by heating a mixture of the glycol derivative, the alcohol, and an acid catalyst to drive off water of condensation.

What is claimed is:

1. A polymeric composition comprising
   (a) a polymer component susceptible to heat-induced deterioration,
   (b) degradation products of a blocked mercaptan present in an amount of from about 1 to about 3.5 parts per hundred parts of said polymer component during processing of said polymeric composition at an elevated temperature, wherein said degradation products comprise a free mercaptan, and wherein said blocked mercaptan has the structure:

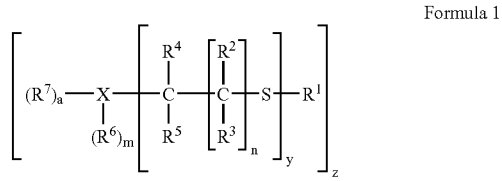

Formula 1 wherein:
   a is 0 or 1, m and n are 0 or 1; y=1 to 4; when y1, z is 1 to 4; when y is more than 1, z is 1;
   $R^1$ is an alkoxycarbonylalkyl, alkoxycarbonylalkylenyl, hydroxyalkoxycarbonylalkyl, hydroxy(polyalkoxy)carbonylalkyl, alkoxy(polyalkoxy)carbonylalkyl, mercaptoalkoxycarbonylalkyl, mercaptoalkoxycarbonylalkylenyl, tetrahydropyranyloxycarbonylalkyl, tetrahydropyranyloxy(polyalkoxy)carbonylalkyl, or alkylcarbonyloxy(polyalkoxy)carbonylalkyl radical having from 1 to 22 carbon atom;
   $R^2$, $R^3$, $R^4$, $R^5$, $R^6$, and $R^7$, are independently hydrogen, a hydroxyl, mercapto, acyl, alkyl, alkylenyl, aryl, haloaryl, alkaryl, aralkyl, hydroxyalkyl, mercaptoalkyl, hydroxyaryl, alkoxyaryl, alkoxyhydroxyaryl, mercaptoalkylenyl, mercaptoalkoxycarbonylalkylenyl, hydroxyaryl, arylcarbonyl, mercaptoaryl, carboxyalkyl, or carboxyaryl radical having from 1 to 22 carbon atoms; and
   X is aryl, haloaryl, alkaryl, hydroxyaryl, dihydroxyaryl, aralkyl, alkoxyaryl, arylcycloalkyl, or a heteroatom;
   with the option that, when a is 1 and m is 0, one of the $R^3$ and $R^5$ radicals joins with $R^7$ and X to farm a heterocyclic moiety with X as a heteroatom selected from the group consisting of oxygen and sulfur;
   with the further option that, when m is 1, $R^6$ and $R^7$ form a heterocyclic moiety in conjunction with X as a nitrogen atom;
   with the proviso that, when $R^6$ is not a hydroxyl or mercapto, z is 1; and
   (c) at least one zinc compound, wherein when both zinc chloride and zinc carboxylate are present, the ratio of zinc contributed by zinc carboxylate to zinc contributed by zinc chloride either is between 0:100 and 10:90 or is between 80:20 and 100:0.

2. The composition of claim 1 wherein said zinc compound is selected from the group consisting of zinc halides, zinc carboxylates, zinc β-diketones, and mixtures thereof.

3. The composition of claim 1 wherein X is oxygen, m is 0, $R^5$ and $R^7$ form a heterocyclic moiety in conjuction with X, and n is 0.

4. The composition of claim 1 wherein $R^1$ is alkoxycarbonylalkyl.

5. The composition of claim 1 wherein said polymeric composition comprises a halogen-containing polymer.

6. The composition of claim 5 wherein said halogen-containing polymer is a vinyl chloride polymer.

7. The composition of claim 1 wherein said composition further comprises at least one organotin compound.

8. A composition for stabilizing PVC comprising
   (a) a zinc compound, wherein when both zinc chloride and zinc carboxylate are present, the ratio of zinc contributed by zinc carboxylate to zinc contributed by zinc chloride either is between 0:100 and 10:90 or is between 80:20 and 100:0, and (b) a latent mercaptan having the formula

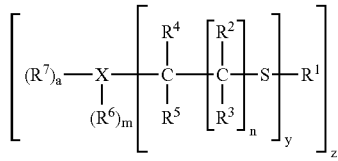

Formula 1 wherein a is 0 or 1, m and n are 0 or 1; y=1 to 4; when y=1, z is 1 to 4 and when y is more than 1, z is 1;

$R^1$ is an alkoxycarbonylalkyl, alkoxycarbonylalkylenyl, hydroxyalkoxycarbonylalkyl, hydroxy(polyalkoxy)carbonylalkyl, alkoxy(polyalkoxy)carbonylalkyl, mercaptoalkoxycarbonylalkyl, mercaptoalkoxycarbonylalkylenyl, tetrahydropyranyloxycarbonylalkyl, tetrahydropyranyloxy(polyalkoxy)carbonylalkyl, or alkylcarbonyloxy(polyalkoxy)carbonylalkyl radical having from 1 to 22 carbon atoms;

$R^2$, $R^3$, $R^4$, $R^5$, $R^6$, $R^7$, are independently hydrogen, a hydroxyl, mercapto, acyl, alkyl, alkylenyl, aryl, haloaryl, alkaryl, aralkyl, hydroxyalkyl, mercaptoalkyl, hydroxyaryl, alkoxyaryl, alkoxyhydroxyaryl, mercaptoalkylenyl, mercaptoalkoxycarbonylalkylenyl, hydroxyaryl, arylcarbonyl, mercaptoaryl, carboxyalkyl, or carboxyaryl radical having from 1 to 22 carbon atom; and X is aryl, haloaryl, alkaryl, hydroxyaryl, dihydroxyaryl, aralkyl, alkoxyaryl, arylcycloalkyl, or a heteroatom;

with the option that, when a is 1 and m is 0, one of the $R^3$ and $R^5$ radicals joins with $R^7$ and X to form a heterocyclic moiety with X as a heteroatom selected from the group consisting of: oxygen and sulfur;

with the further option that, when m is 1, $R^6$ and $R^7$ form a heterocyclic moiety in conjunction with X as a nitrogen atom;

with the proviso that, when $R^6$ is not a hydroxyl or mercapto, z is 1.

9. The composition of claim 8 wherein said zinc compound is selected from the group consisting of zinc halides, zinc carboxylates, zinc β-diketones, and mixtures thereof.

10. The composition of claim 8 wherein X is oxygen, a is 1, m is 0, $R^5$ and $R^7$ form a heterocyclic moiety in conjuction with X, and n is 0.

11. The composition of claim 8 wherein $R^1$ is alkoxycarbonylalkyl.

* * * * *